United States Patent Office 3,532,468
Patented Oct. 6, 1970

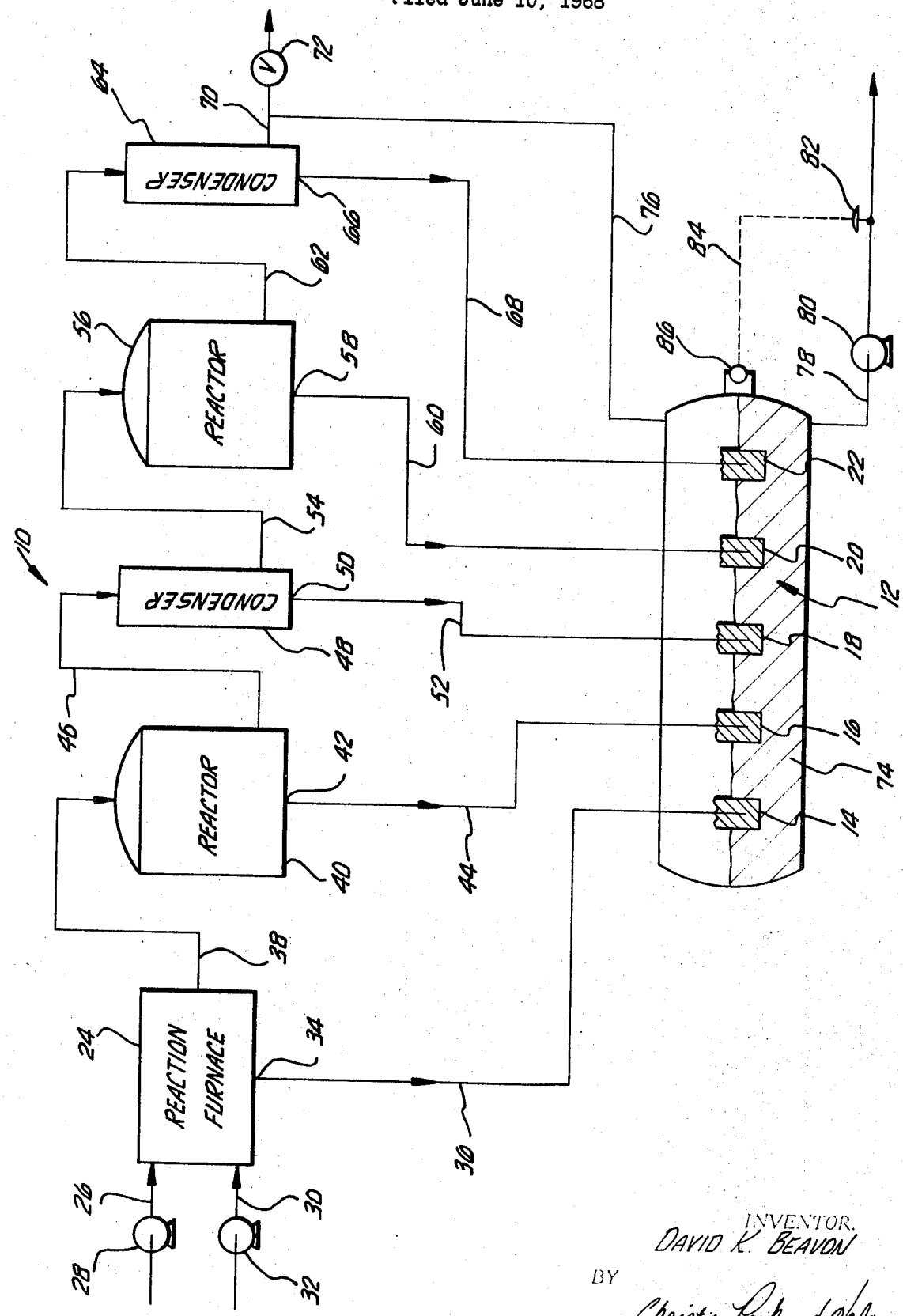

---

3,532,468
HIGH PRESSURE SULFUR WITHDRAWAL SYSTEM
David K. Beavon, Long Beach, Calif., assignor to The Ralph M. Parsons Company, Los Angeles, Calif., a corporation of Nevada
Filed June 10, 1968, Ser. No. 735,701
Int. Cl. C01b *17/02;* B01j *3/02*
U.S. Cl. 23—226                                    3 Claims

ABSTRACT OF THE DISCLOSURE

A sulfur generation plant is operated at superatmospheric pressure to produce sulfur at two or more sources. A pressurized collection vessel operated at a superatmospheric pressure approaching that of the plant is provided to collect sulfur from the various sources. Drains and seal pots communicate each sulfur source with the collection vessel. The superatmospheric pressure in the collection vessel and the static head existing between each drain outlet and the top of its associated seal pot prevent reversal of sulfur flow in the drains and loss of process gases from the generating plant.

BACKGROUND OF THE INVENTION

This invention relates to the production of elemental sulfur and, more in particular, to the production and collection of sulfur at superatmospheric pressures.

A commonly used plant to produce sulfur is known as the Claus plant. Claus plants produce elemental sulfur from sulfur containing compounds such as hydrogen sulfide and sulfur dioxide. Typically, hydrogen sulfide is burned in a furnace with a restricted supply of air to produce sulfur dioxide. The sulfur dioxide formed from this reaction is combined with residual hydrogen sulfide to produce elemental sulfur. The production of elemental sulfur from sulfur dioxide takes place in the furnace and in downstream reactors. Liquid sulfur is withdrawn through drains from a number of points in the plant, including the reaction furnace, reactors and numerous condensers, and collected in a sulfur pit.

The collection of sulfur from the various liquid sulfur sources in the plant is effected through individual seal pots. The seal pots are arranged to overflow into the sulfur pit. Each seal pot has a physical height between its associated drain outlet and its top which is greater than the static head equivalent of its source pressure. This physical height prevents reversal of sulfur flow in other drains and process gas escape from the plant. The physical height of seal pots associated with drains further and further downstream from the reaction furnace are progressively smaller owing to diminishing source pressures occasioned by pressure loss through the plant. This pressure loss is the reason that individual seal pots used for each pot must be sized to match its source. Because the sulfur pit is at essentially atmospheric pressure the required heights of the seal pots to effect their purpose becomes quite large as the operating pressure of the plant increases. For example, the operation of a Claus system at three atmospheres absolute would require seal pot heights greater than two atmospheres equivalent of liquid sulfur head, or approximately 37 feet. The prohibitive heights of the seal pots required with superatmospheric operating pressures has prevented operating the Claus plants at elevated pressures.

The operation of sulfur producing plants at elevated pressures would, in many instances, result in substantial advantages. One such advantage, for example, would be the reduction in the size of the components of the plant required to generate a given amount of liquid sulfur.

The present invention is directed to a sulfur plant which may be operated at superatmospheric pressures without prohibitively sized seal pots.

SUMMARY OF THE INVENTION

The present invention contemplates the operation of a sulfur generation plant at superatmospheric pressures. A superatmospheric pressure is maintained in a sulfur collection vessel to augment the static head of sulfur in each of a series of seal pots in preventing reversal of sulfur flow in other seal pots and loss of process gases.

The sulfur generation plant produces elemental sulfur from at least one sulfur bearing compound. The sulfur produced is collected in liquid phase at at least two sources. Each source is at a different pressure from the other sources because of friction losses through the plant. A pressure tight liquid sulfur collection vessel is provided at a lower elevation than the liquid sulfur sources. A seal pot and drain communicate each source with the collection vessel. Means are provided for maintaining a superatmospheric pressure in the sulfur generating plant. A superatmospheric pressure approaching the value of the plant's pressure is also maintained in the sulfur collection vessel by means such as a line between the interior of the vessel and the plant.

The superatmospheric pressure within the vessel and the static head between the outlet of each drain and the top of its associated seal pot cooperate to prevent reversal of sulfur flow in other drains and loss of process gases from the generating plant through the drains. The aggregate static head and superatmospheric pressure are such as to allow the elevational differential between individual sources and the collection vessel to produce sulfur flow through the drains. Typically, the aggregate value of the static head and superatmospheric pressure in the collection vessel for each seal pot-source combination produces a back pressure equal to or greater than the source pressure.

As was previously mentioned, one means for maintaining a superatmospheric pressure in the sulfur collection vessel is by a line which communicates the interior of the vessel with the plant. This line may be connected in the plant at a point downstream of at least the higher pressure sources to prevent an excessive superatmospheric pressure condition in the sulfur collection vessel. This excessive pressure condition might occur, for example, if the line were connected at a point close to the highest pressure source. Alternatively, a pressure reduction valve may be employed to insure against an excessive pressure condition in the collection vessel. The problem with an excessive pressure condition in the vessel is in reversal of sulfur flow in the drains.

The process of the present invention contemplates the operation of an elemental sulfur production plant and a sulfur collection vessel at superatmospheric pressures. The plant is of the type wherein elemental sulfur is produced from a sulfur bearing compound in liquid form at two or more sources. These sources operate at different pressures because of pressure loss in the plant. Each source is communicated to the collection vessel through a drain which empties into a seal pot. The plant is maintained at a superatmospheric pressure of at least 5 p.s.i.g. The collection vessel is lower than the plant to allow sulfur withdrawal through the drains. The collection vessel pressure and static head existing between each drain outlet and the top of its associated seal pot are such as to prevent reversal of sulfur flow in other drains and loss of process gases from the plant through the drains. This condition is met when each source pressure is less than the sum of the static head in its seal pot and the pressure in the collection vessel.

The present invention has general applicability to sulfur generating plants where liquid sulfur is extracted from the plants from sources operating at different pressures. One such plant is the well-known Claus system.

In terms of the Claus system, elemental sulfur is produced from such feed compounds as $H_2S$, $SO_2$ and COS, or mixtures of these compounds. These compounds are converted into elemental sulfur in a plant having a reaction furnace and several downstream reactors and condensers. The reaction furnace and the reactors and condensers are all sources of liquid sulfur. With reference to the Claus plant, the present invention provides a pressurized collection vessel having a plurality of seal pots corresponding in number to the number of liquid sulfur sources. Each seal pot is connected through a drain to its associated source. The pressure within the plant is maintained at superatmospheric pressures, typically between 5 and 30 p.s.i.g. The pressure in the collection vessel approaches that of the various source pressures within about 5 p.s.i.g. or less. Again, the vessel is lower than the source to provide sulfur feed to the vessel. Thus, the physical heights of the seal pots within the collection vessel are relatively low.

The present invention provides a plant and process for the production of elemental sulfur at elevated or superatmospheric pressures. By pressurizing the collection vessel, the physical heights of the seal pots do not become prohibitive as would be the case with plant operation at superatmospheric pressures and collection vessel operation at atmospheric pressure.

These and other features, aspects and advantages of the present invention will become more apparent from the following description, appended claims and drawing.

BRIEF DESCRIPTION OF THE FIGURE

The single figure illustrates schematically the plant and method of the present invention.

DESCRIPTION OF THE PREFERRED EMBODIMENTS

In general, the figure illustrates a Claus plant 10 which is adapted to operate at superatmospheric pressures and a sulfur collection vessel or drum 12 which is also adapted to operate at superatmospheric pressures. The collection vessel has a plurality of standard seal pots 14 through 22 which are connected through drains to various sources of liquid sulfur in Claus plant 10.

Except for its capability of operating at superatmospheric pressures, Claus plant 10 is of standard design. Therefore, the description of the plant will not be extensive.

The plant includes a reaction furnace 24 which receives a sulfur bearing compound from a stream 26. This compound may be $H_2S$, $SO_2$, COS or mixtures of these substances. The stream is compressed by a compressor 28 for its introduction into reaction furnace 24. An oxidizing stream 30 is compressed by a compressor 32 and introduced into the reaction furnace for reaction with the sulfur bearing compounds in stream 26 at a superatmospheric pressure. Typically, stream 26 is hydrogen sulfide and stream 30 air. In this case, the oxygen from stream 30 reacts with the hydrogen sulfide to produce sulfur dioxide and water. The sulfur dioxide reacts with residual hydrogen sulfide to produce elemental sulfur and water. The sulfur dioxide-hydrogen sulfide reaction occurs in part in reaction furnace 24. The elemental sulfur produced in the furnace accumulates in liquid form at a first source 34. A drain 36 connects source 34 with its associated seal pot 14 within collection vessel 12. The gaseous reaction products from furnace 24 as well as unreacted feed products leave as a stream 38 and pass into a first reactor 40.

Reactor 40 contains a catalyst that drives the reaction to produce more elemental sulfur in liquid form which is collected at a reactor source 42. Source 42 is connected with its associated seal pot 16 through a drain 44. A gaseous stream 46 containing sulfur leaves reactor 40 and passes into a condenser 48. In condenser 48 elemental sulfur in the stream is condensed into liquid and collected at a source 50. Source 50 is connected to its associated seal pot 18 by a drain 52.

A gaseous stream 54 leaves condenser 48 for further reaction and production of elemental sulfur in a downstream reactor 56. Reactor 56 contains a catalyst for the conversion of the sulfur bearing compound in stream 54 into elemental sulfur. A portion of the elemental sulfur produced in this reactor will be collected in liquid form at a reactor source 58. Again, this source of liquid sulfur is connected to a seal pot, in this case seal pot 20, through a drain which is denominated by reference numeral 60. Again, gaseous sulfur is produced by the reaction in reactor 58 and leaves this reactor in a stream 62. This gaseous sulfur is condensed in a condenser 64. The condensed elemental sulfur appears at a source 66 within condenser 64 where it flows by gravity through a drain 68 into seal pot 22.

Plant 10 may contain more or less stages for producing elemental sulfur. An additional stage may be a coalescer which is not shown in the figure. The gas stream leaving condenser 64 is shown by reference numeral 70. Pressure control valve 72 is present in stream 70 to maintain a superatmospheric pressure throughout plant 10. Typically, this pressure would be between 5 p.s.i.g. and 30 p.s.i.g. Because of friction, the pressure at source 34 will be greater than at source 66 with the remaining sources at pressures in between the pressures at sources 34 and 66.

Collection vessel 12 receives liquid sulfur from the various sources in plant 10. This sulfur originally passes into seal pots 14 through 22 which fill and overflow into the vessel proper. Accumulated sulfur within the vessel is shown by reference numeral 74. In the embodiment illustrated, superatmospheric pressure is maintained in vessel 12 by communicating the interior of the vessel with the plant through line 76. Line 76 is connected in plant 10 upstream of valve 72 to the line containing stream 70. The superatmospheric condition existing in vessel 12 complements the static head existing within the seal pots to prevent reversal of sulfur flow in the drains and escape of process gases from the plant. The pressure existing in plant 10 diminishes from reaction furnace 24 to condenser 64. The purpose of the seal pots and the elevated pressure in vessel 12 is to prevent any of the sources from seeing a pressure at its associated pot which is in excess of the particular source's pressure. Without a superatmospheric condition within vessel 12, this condition could only be met by a static head in each of the seal pots. Typically, this static head diminishes as the source pressure diminishes. Thus, the static head required in seal pot 22 is lower than the static head required in seal pot 14. Without the imposition of a superatmospheric pressure within vessel 12, seal pot height becomes increasingly large with increases in operating pressure of plant 10. As was previously pointed out, in the case of a pressure of two atmospheres, say at source 34, and atmospheric pressure within vessel 12, seal pot 14 would have to be as high as 37 feet to accomplish its purpose. The height of seal pot 22 under these conditions would be slightly smaller because of the diminished pressure at source 66 but nonetheless quite large.

As in previous plants of the type discussed here, the collection vessel is lower in elevation than the various sources in order to obtain sulfur flow to the vessel. Sulfur flow is assured when each source's pressure plus the elevational difference between each source and its drain outlet exceed the sum of the static head and superatmospheric pressure in the vessel.

Sulfur product may be taken from vessel 12 as a stream 78. Withdrawal is effected through a pump 80. The level of sulfur liquid 74 within vessel 12 may be maintained within desired limits by providing a pressure sensitive valve 82 which is actuated to open by the existence of a predetermined pressure on its pilot line 84. Pilot line 84 senses the pressure existing in liquid level indicator 86.

The present invention has been described with reference to a certain preferred embodiment. It should be understood by those skilled in the art, however, that the foregoing description should not necessarily limit the spirit and scope of the appended claims.

What is claimed is:

1. In combination with a sulfur generating plant of the type wherein elemental sulfur is produced in liquid phase at at least two sources from at least one sulfur containing material with each source being at a pressure different from the other sources, an improvement which comprises:
   (a) a pressure tight liquid sulfur collection vessel lower in elevation than the sources of liquid sulfur;
   (b) a seal pot in the sulfur collection vessel for each source;
   (c) a drain communicating each source with its associated seal pot;
   (d) means for maintaining a superatmospheric pressure in the sulfur generating plant; and
   (e) means for maintaining a superatmospheric pressure in the sulfur collection vessel sufficient in value to augment the static head between each drain outlet and the top of its associated seal pot to prevent reversal of sulfur flow in other drains and loss of process gases from the generating plant through the drains into the sulfur collection vessel.

2. The improvement claimed in claim 1 wherein: the means for maintaining a superatmospheric pressure within the liquid sulfur collection vessel includes a line between the vessel and the plant, the line being in pressure communication with the plant at a point where the pressure does not cause reversal of sulfur flow in any of the drains or loss of process gases from the plant through the drains.

3. An improvement in a process for producing elemental sulfur from at least one sulfur bearing compound of the type wherein liquid sulfur is produced at different pressures at at least two sources in a plant and drained from each source through drains into individual seal pots associated with each source and disposed in a collection vessel, each seal pot being lower than its associated source the improvement comprising the steps of:
   (a) maintaining the plant at a superatmospheric pressure of at least 5 p.s.i.g.; and
   (b) maintaining a superatmospheric pressure in the collection vessel of sufficient value to augment the static head between each drain outlet and the top of its associated seal pot to prevent reversal of sulfur flow in other drains and loss of process gases from the plant through the drains into the sulfur collection vessel.

References Cited

UNITED STATES PATENTS

| 2,413,714 | 1/1947 | Keeling | 23—225 |
| 3,170,766 | 2/1965 | Townsend | 23—262 X |

OSCAR R. VERTIZ, Primary Examiner

G. O. PETERS, Assistant Examiner

U.S. Cl. X.R.

23—1, 262; 137—206